July 25, 1961

E. J. HAMMER ET AL 2,993,545

FINGER WHEEL ASSEMBLY FOR A BEET HARVESTER

Filed July 21, 1959

INVENTORS
ERVIN J. HAMMER
& ORRIN H. HAMMER
BY

*McMorrow, Berman & Davidson*
ATTORNEYS

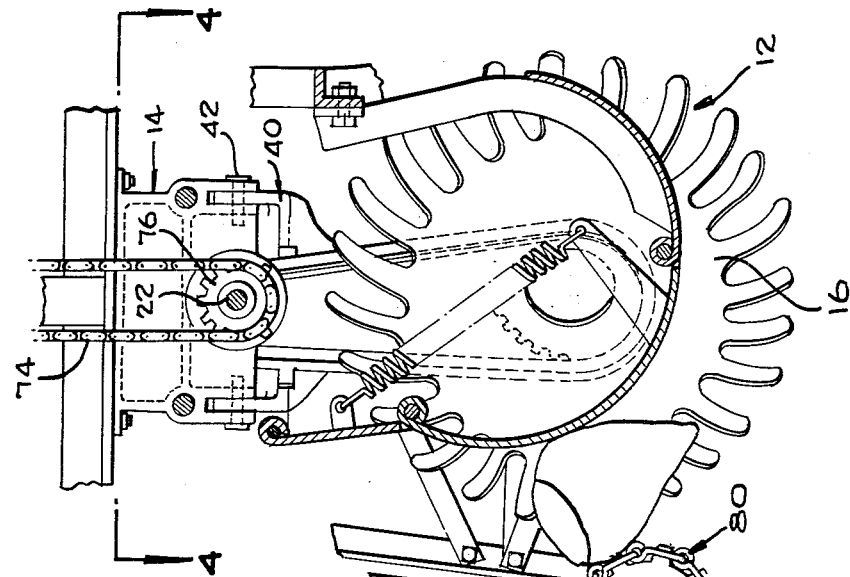
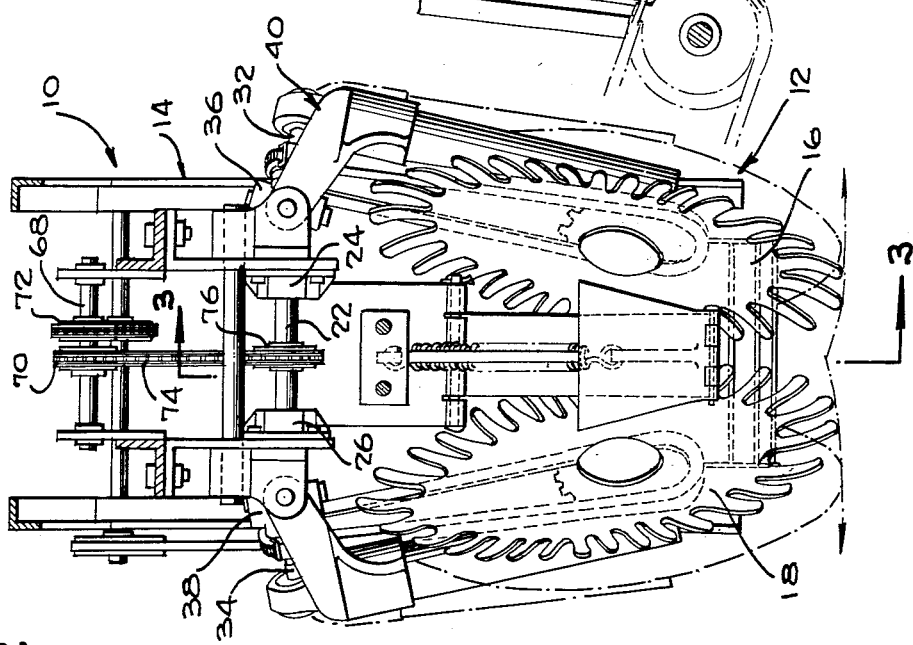

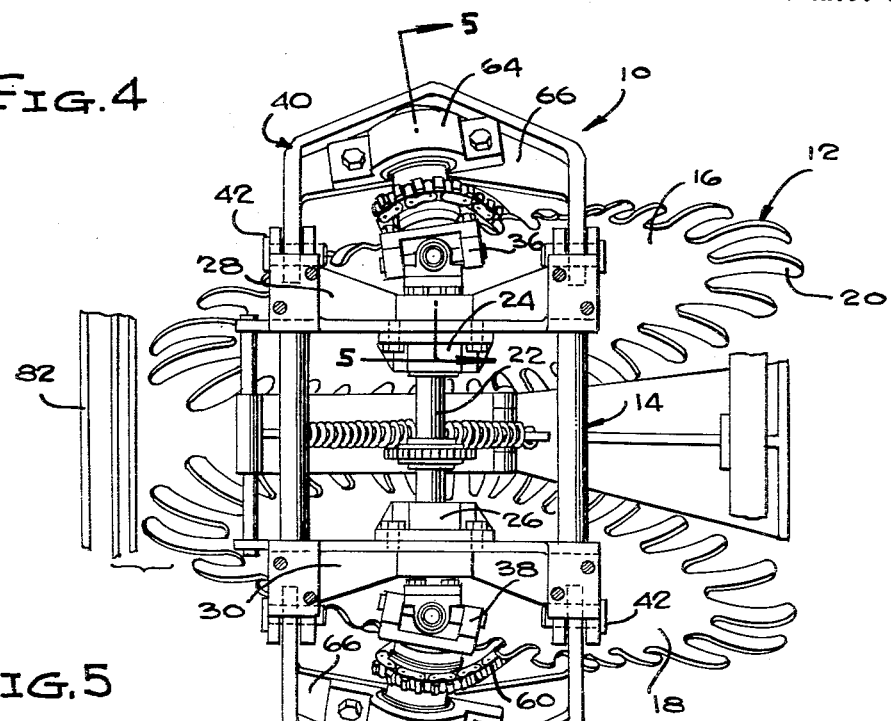
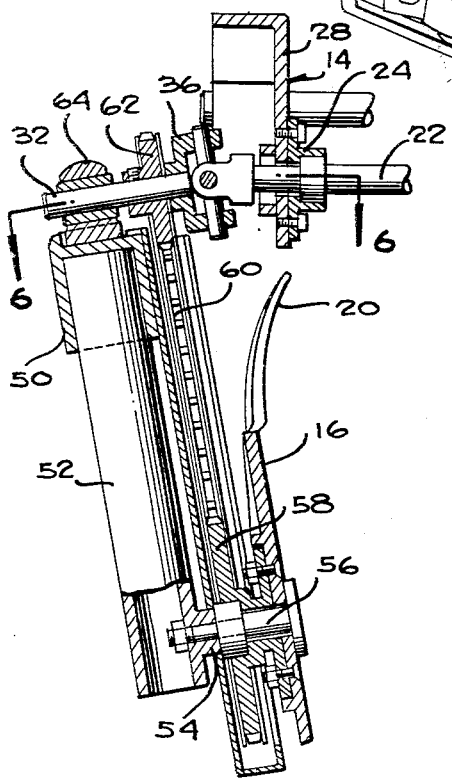
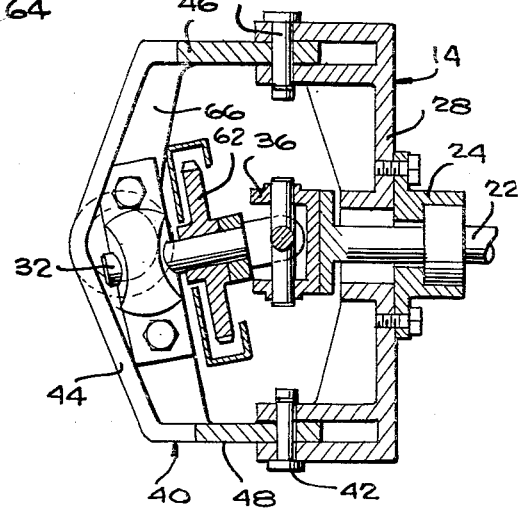

{ # United States Patent Office 2,993,545
Patented July 25, 1961

2,993,545
FINGER WHEEL ASSEMBLY FOR A BEET HARVESTER
Ervin J. Hammer, P.O. Box 44, Miller City, Ohio, and Orrin H. Hammer, 1005 W. Tiffin St., Fostoria, Ohio
Filed July 21, 1959, Ser. No. 828,557
4 Claims. (Cl. 171—58)

The present invention relates to a finger wheel assembly for a beet harvester.

Previously proposed and presently in use have been beet harvesters employing a pair of laterally spaced finger wheels for lifting uprooted sugar beets and the like from the ground surface and elevating the same to a conveyor means for movement into a storage compartment or other vehicle. In such beet harvesters, the finger wheels are arranged so as to be movable toward and away from each other with springs pulling them to the position toward each other so that a resilient action is obtained when the fingers of such wheels grip the uprooted beets. Due to the movement of the wheels toward and away from each other, the drive means for such finger wheels has not been in all cases satisfactory for many reasons. Additionally, as the finger wheels are normally positioned with their lower peripheral portions in close or nearly touching relation, uprooted beets dislodged by the plow points from the ground surface when gripped between the fingers of the finger wheels are not elevated sufficiently in all cases and frequently the following conveyor means must be lowered so as to receive thereon the conveyed beets.

An object of the present invention is to provide a finger wheel assembly for a beet harvester which has the finger wheels so disposed as to provide optimum elevation to the dislodged sugar beets.

Another object of the present invention is to provide an improved and novel drive means for the finger wheels of a finger wheel assembly for a beet harvester.

A further object of the present invention is to provide a finger wheel assembly for a beet harvester which is efficient in action, one which lends itself to attachment to the elevating mechanism of a tractor, one which lends itself to ready adjustment for various size beets, and one which is economically feasible.

These and other objects and advantages of the present invention will be fully apparent from the following description when taken in conjunction with the annexed drawings, in which:

FIGURE 2 is a view taken on the line 2—2 of FIGURE 1;

FIGURE 3 is a view taken on the line 3—3 of FIGURE 2;

FIGURE 4 is a view taken on the line 4—4 of FIGURE 3;

FIGURE 5 is a view on an enlarged scale, taken on the line 5—5 of FIGURE 4; and

FIGURE 6 is a view taken on the line 6—6 of FIGURE 5.

Figure 1:
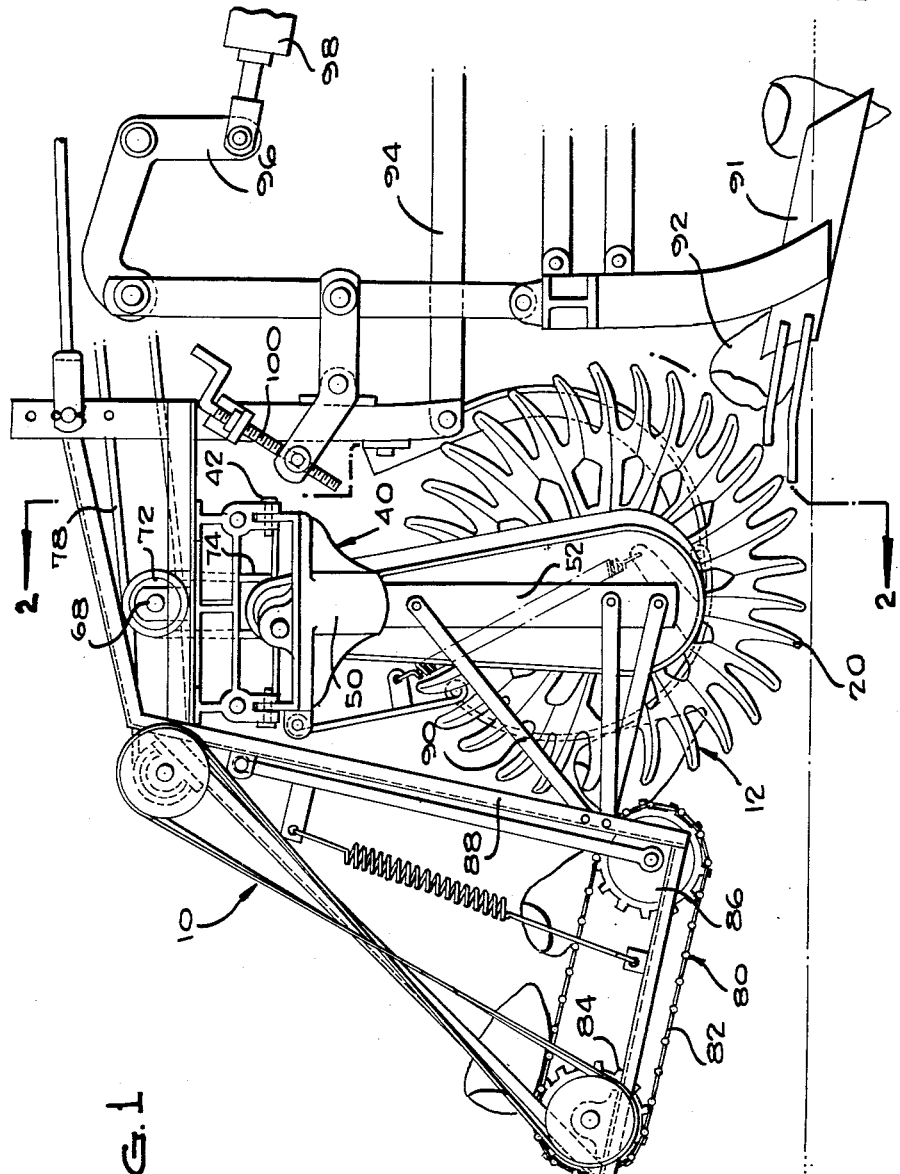
FIGURE 1 is a side elevational view of the finger wheel assembly of the present invention, shown attached to the elevating draw bars of the tractor.

Referring in greater detail to the drawings in which like numerals indicate like parts throughout the several views, the reference numeral 10 designates generally a beet harvester and the numeral 12 the finger wheel assembly of such harvester 10. The assembly 12 includes a mobile frame 14 and a pair of rotatable opposed crop digging and elevating wheels 16 and 18, as shown in FIGURE 2.

Each of the wheels 16 and 18 has a plurality of spaced fingers 20 extending about and projecting from the periphery of the wheel 16 or 18.

The mobile frame 14 has a pair of wheel supports or yokes 40, each of which is supported from the mobile frame 14 by means of a substantially horizontal longitudinally-extending pivot means. Specifically, the pivot means, FIGURES 4 and 6, comprises the two pairs of longitudinally-spaced pivot pins 42 which pivotally connect the legs of the yokes 40 to the frame members 28 and 30 respectively, which are carried by the frame 14.

Power driven means interconnects each of the wheels 16 and 18 with a suitable source of power on the mobile frame 14. The power means includes a horizontally-disposed driven shaft 22, FIGURES 4 and 5, which extends from one to the other of the yokes 40, and which has portions inwardly of its ends supported in bearings 24 and 26, carried by the frame members 28 and 30 respectively. A stub shaft 32 is positioned contiguous to the end of the shaft 22 supported in the bearing 24 and another stub shaft 34 is positioned contiguous to the end of the shaft 22 supported in the bearing 26. The universal joints 36 and 38 connect the stub shafts 32 and 34 to the ends of the shaft 22 for universal movement with respect to the shaft 22.

Means is provided embodying a sprocket and chain connection drivingly connecting each of the stub shafts 32 and 34 to the adjacent wheels 16 and 18, respectively, for rotation of the wheels 16 and 18 with the stub shafts 32 and 34 responsive to the rotation of the shaft 22. The shaft 22 is drivingly connected to a suitable source of power on the mobile frame, to be subsequently described.

Each of the yokes 40 consists in a bight 44 and legs 46 and 48 projecting from the bight 44 and provided with holes through which the pins 42 extend. Depending from the midportion of each of the bights 44 is a tubular socket 50 (FIGURE 1) receiving a tubular member 52 therein. A trunnion 54 projects from one side of the tubular member 52 inwardly of the lower end of the latter. A stub shaft 56 is journaled in the trunnion 54 and carries a sprocket wheel 58 and the adjacent wheel 16 or 18. A drive chain 60 runs over the sprocket wheel 58 and over another sprocket wheel 62 secured to the adjacent stub shaft 32 or 34.

A bearing block 64 receives the adjacent end portion of each of the stub shafts 32 and 34 and is fixedly secured to the web 66 which forms a part of the adjacent yoke 40 and extends between the portions of the legs 46 and 48 adjacent the bight 44 of the yoke 40.

In superimposed and parallel relation with respect to the shaft 22 is an idler shaft 68 carrying sprocket wheels 70 and 72. The sprocket wheel 70 is connected by the chain 74 to a sprocket wheel 76 carried on the shaft 22 and another chain 78 connects the sprocket wheel 72 with the power take-off of the tractor on which the harvester 10 of the present invention is installed.

A conveyor assembly 80 is arranged in tandem relation with respect to the wheel assembly and consists in an endless belt 82 driven over sprocket wheels 84 and 86, the conveyor assembly 80 being mounted upon a frame 88 held in position behind the wheels 16 and 18 by means of brace members 90 which have their forward ends secured to the adjacent tubular member 52 and their rearward ends secured to the frame 88.

The harvester 10 includes plow points 91 preceding the wheels 16 and 18 and adapted to dislodge from the ground sugar beets or other vegetables to be harvested, as at 92 in FIGURE 1. The harvester 10 is supported upon the tractor draw bars 94 and 96 in the conventional manner and is raised and lowered by the tractor hydraulic cylinder mechanism 98, as in FIGURE 1.

A hand adjustable screw 100 is employed between the draw bars 94 and 96 on the frame 14 for raising and lowering the rearward end of the harvester 10 relative to the tractor draw bars.

In operation, the harvester 10 is easily installed upon the tractor draw bars and lowered into position in which the plow points engage the ground and dislodge the beets 92 therefrom for grasping by the fingers 20 of the wheels 16 and 18. Due to the position of the wheels 16 and 18 relative to each other in which the convergent portions of the wheels define a throat which is narrower and higher at the rearward side of the wheels than at the space between the convergent portions of the wheels at the forward side of the wheels, the beets are grasped by the fingers 20 and are raised to the top of the conveyor assembly 80 for travel thereon to a conveyor or other vehicle for transport out of the field.

The important feature of this invention resides in the positioning of the wheels 16 and 18 relative to each other so that the closest point of the fingers 20 is above the ground surface and rearwardly of the vertical center line drawn through the axis of rotation of the wheels 16 and 18.

What is claimed is:

1. A beet harvester comprising a mobile frame having associated therewith a pair of opposed crop digging and elevating fingered wheels, a pair of wheel supports on said mobile frame, each of said wheel supports being supported from said mobile frame by means of a substantially horizontal longitudinally-extending pivot means, and power driven means interconnecting each of said wheels with a suitable source of power on said mobile frame.

2. A beet harvester comprising a mobile frame having associated therewith a pair of opposed crop digging and elevating fingered wheels, a pair of wheel supports each embodying a yoke and on said mobile frame, each of said yokes being supported from said frame by means of a substantially horizontal longitudinally-extending pivot pin, and power driven means interconnecting each of said wheels with a suitable source of power on said mobile frame.

3. A beet harvester comprising a mobile frame having associated therewith a pair of opposed crop digging and elevating fingered wheels, a pair of wheel supports each embodying a yoke and on said mobile frame, each of said yokes being supported from said frame by means of a substantially horizontal longitudinally-extending pivot pin, and power driven means interconnecting each of said wheels with a suitable source of power on said mobile frame, said power means including a horizontally-disposed driven shaft carried by said mobile frame and extending from one to the other of said yokes, a stub shaft connected to each end of said shaft for universal movement with respect to said shaft, and means drivingly connecting each of said stub shafts to the adjacent wheel for rotation with said stub shaft.

4. A beet harvester comprising a mobile frame having associated therewith a pair of opposed crop digging and elevating fingered wheels, a pair of wheel supports each embodying a yoke and on said mobile frame, each of said yokes being supported from said frame by means of a substantially horizontal longitudinally-extending pivot pin, and power driven means interconnecting each of said wheels with a suitable source of power on said mobile frame, said power means including a horizontally-disposed driven shaft carried by said mobile frame and extending from one to the other of said yokes, a stub shaft connected to each end of said shaft for universal movement with respect to said shaft, and means embodying a sprocket and chain connection connecting each of said stub shafts to the adjacent wheel for rotation with said stub shaft.

References Cited in the file of this patent

UNITED STATES PATENTS

| 1,620,019 | Hammer et al. | Mar. 8, 1927 |
| 2,682,739 | Bozeman et al. | July 6, 1954 |
| 2,888,081 | Hammer et al. | May 26, 1959 |